US009755462B2

(12) United States Patent
Jurkovic et al.

(10) Patent No.: US 9,755,462 B2
(45) Date of Patent: Sep. 5, 2017

(54) ROTOR GEOMETRY FOR INTERIOR PERMANENT MAGNET MACHINE HAVING RARE EARTH MAGNETS WITH NO HEAVY RARE EARTH ELEMENTS

(71) Applicant: GM GLOBAL TECHNOLOGY OPERATIONS LLC, Detroit, MI (US)

(72) Inventors: Sinisa Jurkovic, Sterling Heights, MI (US); Khwaja M. Rahman, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 151 days.

(21) Appl. No.: 14/630,023

(22) Filed: Feb. 24, 2015

(65) Prior Publication Data

US 2016/0248282 A1 Aug. 25, 2016

(51) Int. Cl.
*H02K 21/12* (2006.01)
*H02K 1/27* (2006.01)
*H02K 1/02* (2006.01)
*H02K 1/24* (2006.01)

(52) U.S. Cl.
CPC ............. *H02K 1/02* (2013.01); *H02K 1/2766* (2013.01); *H02K 1/246* (2013.01)

(58) Field of Classification Search
CPC ..................................................... H02K 1/276
USPC ........................... 310/156.38, 156.45, 156.56
See application file for complete search history.

(56) References Cited

U.S. PATENT DOCUMENTS

| | | | | |
|---|---|---|---|---|
| 8,884,485 B2* | 11/2014 | Jurkovic | .............. | H02K 1/2766 310/156.47 |
| 2005/0140236 A1* | 6/2005 | Jeong | ................... | H02K 1/2766 310/156.53 |
| 2008/0007131 A1* | 1/2008 | Cai | ...................... | H02K 1/2766 310/156.38 |
| 2010/0141076 A1* | 6/2010 | Blissenbach | ......... | H02K 1/2766 310/156.53 |
| 2013/0320797 A1* | 12/2013 | Vyas | .................... | H02K 1/2766 310/156.43 |
| 2014/0286816 A1* | 9/2014 | Kato | ...................... | H01F 1/053 419/33 |

* cited by examiner

Primary Examiner — Jose Gonzales Quinones
(74) Attorney, Agent, or Firm — Quinn IP Law

(57) ABSTRACT

An interior permanent magnet machine includes a wound stator, and a rotor core defining a plurality of pole cavities. Each of the pole cavities includes a cross section, perpendicular to a central axis of rotation, that defines a cross sectional shape having a centerline. The cross sectional shape of each of the pole cavities includes a radially inner barrier portion, a radially outer barrier portion, and a central portion. The centerline of the cross sectional shape of each of the radially outer barrier portion and the radially inner barrier portion, of each pole cavity, is defined by a generally arcuate segment. The centerline of the cross sectional shape of the central portion, of each pole cavity, is defined by a linear segment. One of a plurality of rare earth magnets, having no heavy rare earth elements, is disposed within the central portion of one of the plurality of pole cavities.

19 Claims, 3 Drawing Sheets

ROTOR GEOMETRY FOR INTERIOR PERMANENT MAGNET MACHINE HAVING RARE EARTH MAGNETS WITH NO HEAVY RARE EARTH ELEMENTS

TECHNICAL FIELD

The disclosure generally relates to an interior permanent magnet machine.

BACKGROUND

Interior Permanent Magnet (IPM) machines include a rotor assembly having a plurality of magnets of alternating polarity disposed around an outer periphery of the rotor assembly. The rotor assembly is rotatable within a stator which includes a plurality of windings. The rotor assembly magnetically interacts with the stator to generate rotation of the rotor assembly about a central axis of rotation.

An IPM machine may use either ferrite magnets or rare earth magnets, such as NdFeB. Ferrite magnets are less expensive, but produce a lower performance compared to rare earth magnets when utilized in identically configured IPM machines. Rare earth magnets typically used in IPM machines often include a heavy rare earth element, such as dysprosium or terbium, for operating temperature stability. Rare earth magnets that do not include the heavy rare earth elements have a significantly lower coercivity than rare earth magnets that do include the heavy rare earth elements, which makes them more susceptible to demagnetization. However, the inclusion of the heavy rare earth elements in the rare earth magnets increases the cost of the rare earth magnets.

SUMMARY

An interior permanent magnet (IPM) machine is provided. The IPM machine includes a wound stator, and a rotor core. The rotor core includes a plurality of poles, with each pole defining a plurality of pole cavities. Each of the plurality of pole cavities includes a cross section, perpendicular to a central axis of rotation, that defines a cross sectional shape having a centerline. The cross sectional shape of each of the plurality of pole cavities includes a radially inner barrier portion, a radially outer barrier portion, and a central portion. The central portion is disposed between the radially inner barrier portion and the radially outer barrier portion. The centerline of the cross sectional shape of each of the radially outer barrier portion and the radially inner barrier portion, of each pole cavity, is defined by a generally conic segment. The centerline of the cross sectional shape of the central portion, of each pole cavity, is defined by a linear segment. The IPM machine further includes a plurality of magnets. One of the plurality of magnets is disposed within the central portion of one of the plurality of pole cavities.

Accordingly, the radially inner barrier portion and the radially outer barrier portion of each pole cavity provides sufficient protection against demagnetization to allow the use of rare earth magnets that do not include any heavy rare earth elements, such as dysprosium or terbium. The straight, linear central portion of each of the pole cavities allows for the use of sintered, pre-manufactured rare earth magnets, and securely positions the rare earth magnets in place, because the radially inner barrier portion and the radially outer barrier portion include conic shapes that don't allow the rectangularly shaped rare earth magnet to move radially inward or outward relative to the central axis of rotation.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
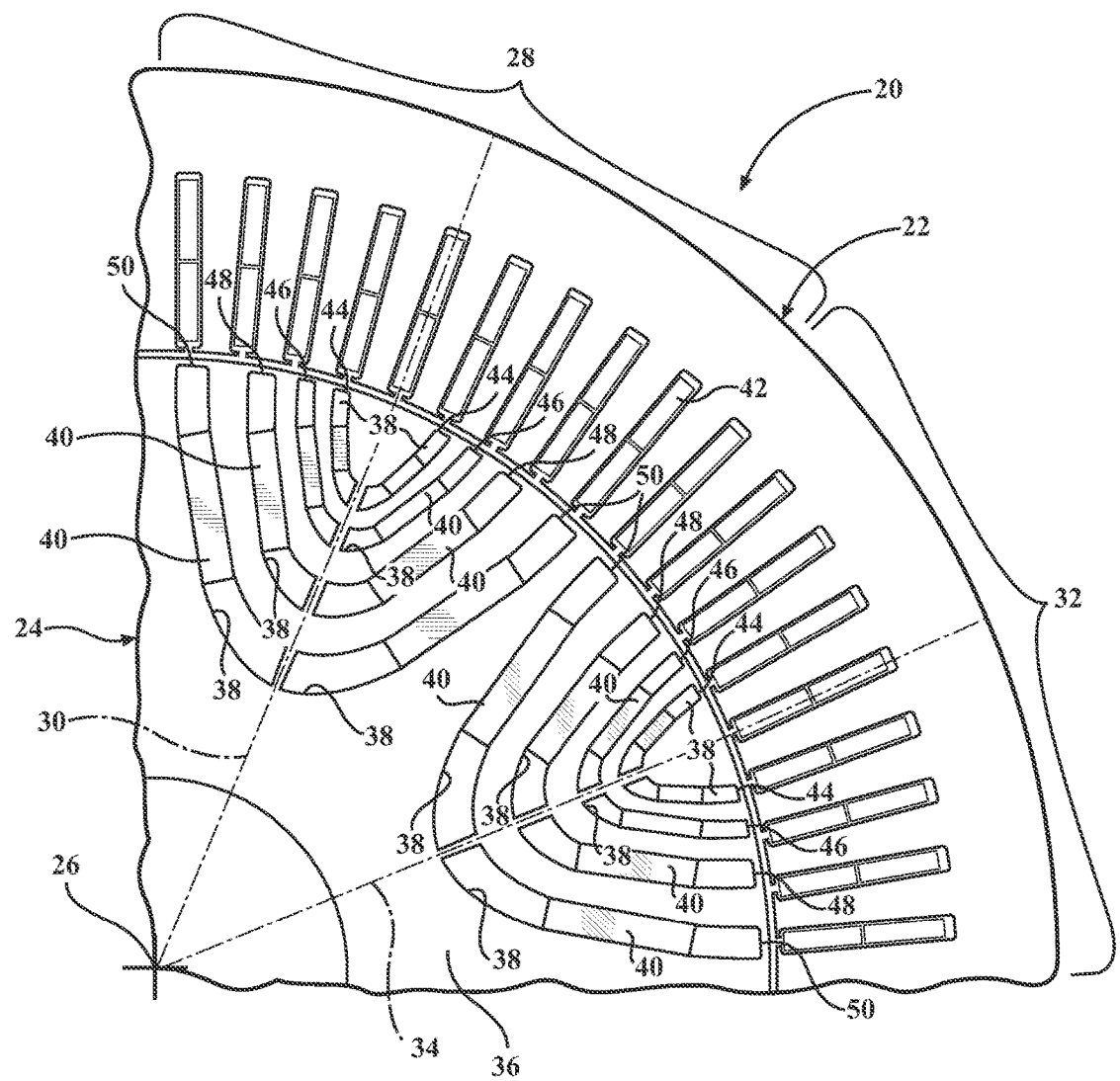
FIG. 1 is a schematic, fragmentary, cross sectional view of an interior permanent magnet machine.
Figure 2:
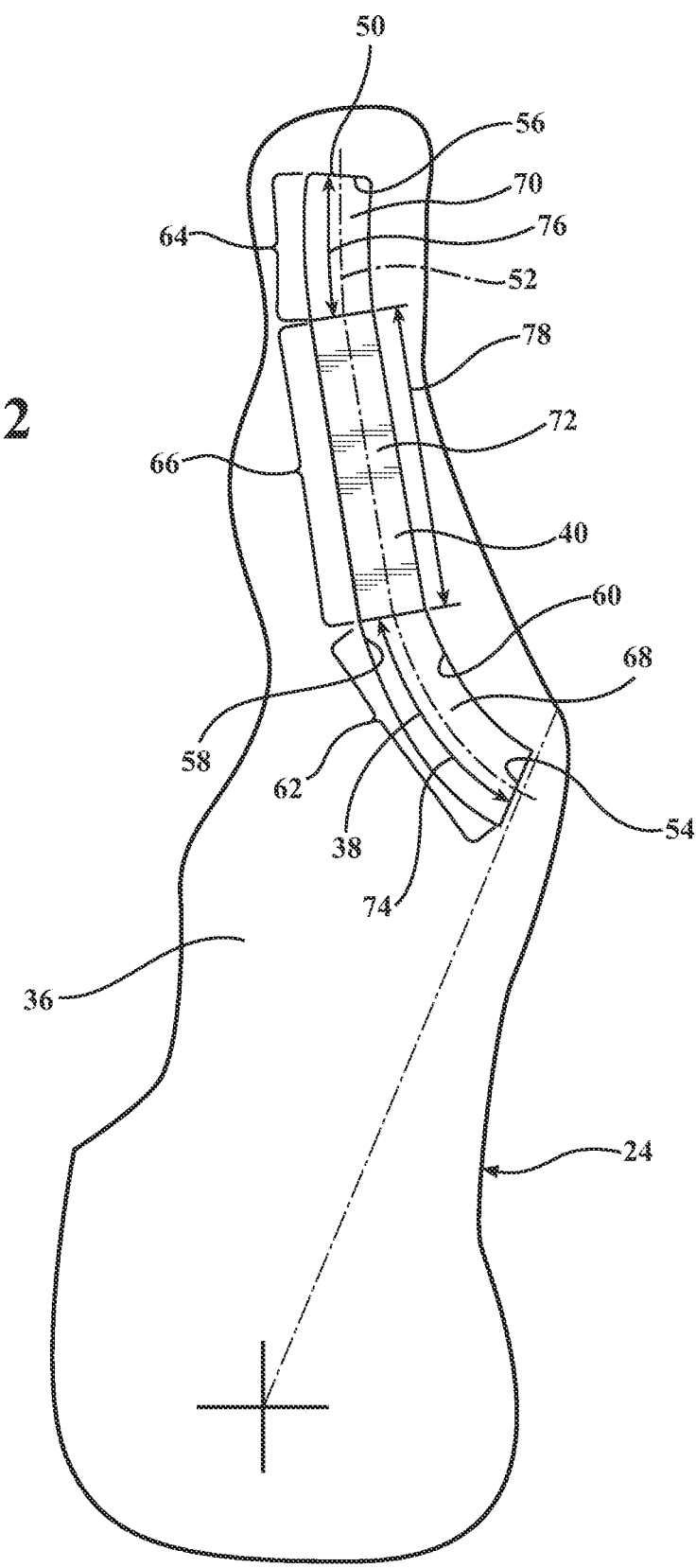
FIG. 2 is an enlarged schematic, fragmentary, cross sectional view of the interior permanent magnet machine showing a pole cavity and a magnet therein.

Referring to FIGS. 1 and 2, wherein like numerals indicate like parts throughout FIG. 1, an Interior Permanent Magnet (IPM) machine is generally shown at 20. The IPM machine 20 may include, but is not limited to an electric motor or other similar device.

Figure 3:
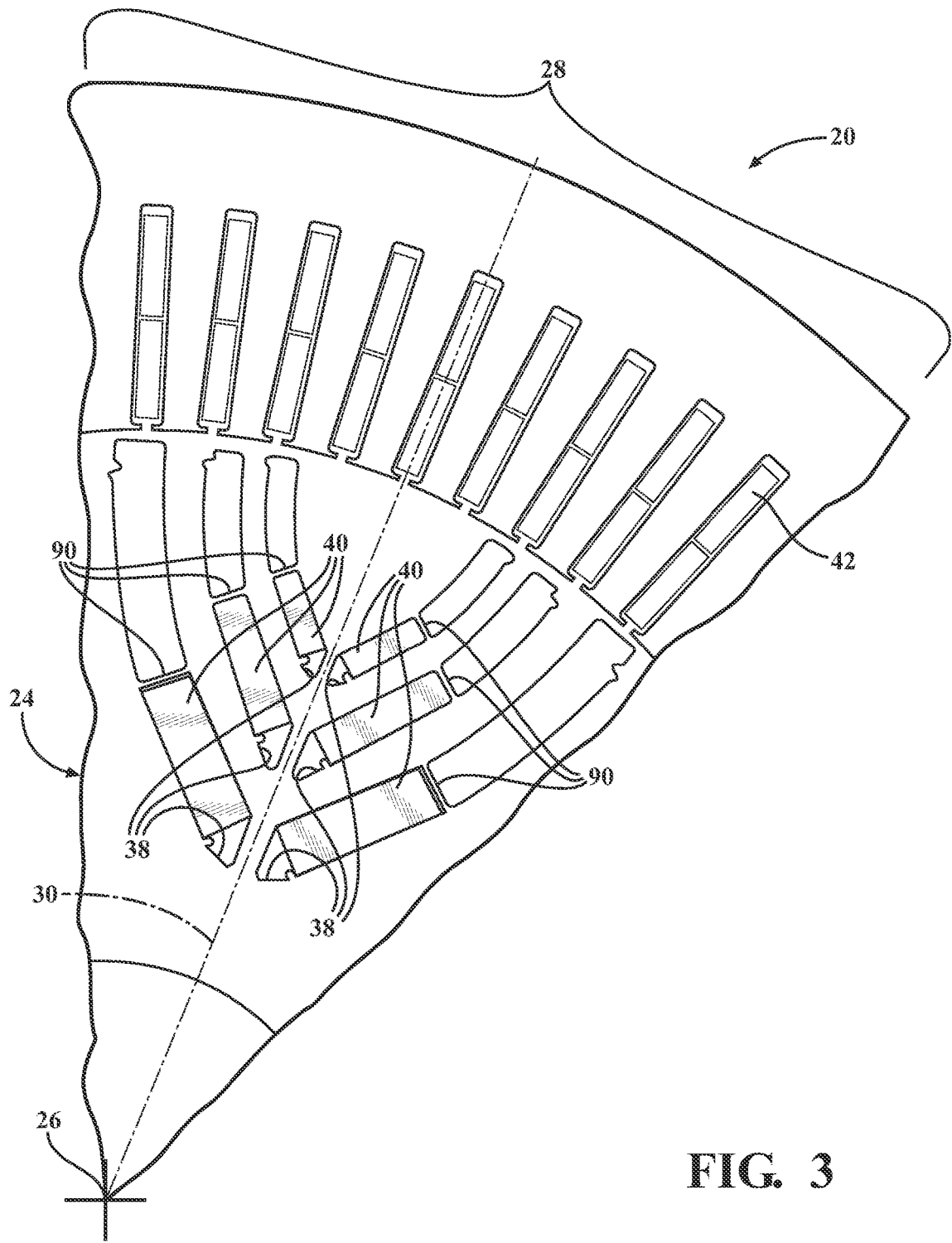
FIG. 3 is a schematic, fragmentary, cross sectional view of the interior permanent magnet machine showing an alternative embodiment of a rotor assembly.

Referring to FIGS. 1 and 3, the IPM machine 20 includes a wound stator 22 and a rotor assembly 24. The rotor assembly 24 is configured for magnetically interacting with the wound stator 22 to rotate relative to the wound stator 22 about a central axis of rotation 26. As shown, the rotor assembly 24 includes a first pole 28 (e.g., a north pole) centered along a first pole axis 30, and a second pole 32 (e.g., a south pole) centered along a second pole axis 34. The first pole axis 30 and the second pole axis 34 extend radially outward from the central axis of rotation 26 through a center of the first pole 28 and the second pole 32 respectively. The central axis of rotation 26 is disposed at a center of a rotor core 36.

Preferably, the rotor assembly 24 includes a plurality of first poles 28 and a plurality of second poles 32. The number of the first poles 28 is equal to the number of the second poles 32. The first poles 28 and the second poles 32 are arranged angularly about the central axis of rotation 26 in an alternating relationship. When the rotor assembly 24 includes a plurality of first poles 28 and a plurality of second poles 32, each first pole 28 is circumferentially disposed between two second poles 32, and each second pole 32 is circumferentially disposed between two first poles 28.

As noted above, the rotor assembly 24 includes the rotor core 36, which includes a plurality of poles 28, 32. Each of the poles (either the first pole 28 or the second pole 32) defines a plurality of pole cavities 38. The first pole(s) 28 and the second pole(s) 32 are arranged and/or configured in an identical manner. Each of the poles 28, 32 of the rotor assembly 24 includes a pre-determined number of pole cavities 38, arranged in a pre-defined configuration. All of the pole cavities 38 of the rotor core 36 extend threedimensionally into the rotor core 36 as viewed on the page of FIGS. 1 and 3. The pole cavities 38 may include cutouts, slots, etc., as is known in the art. The difference between the embodiment of the rotor assembly 24 shown in FIG. 1 and the embodiment of the rotor assembly shown in FIG. 3 is found in the configuration and or shape of the pole cavities 38.

The rotor assembly 24 further includes a plurality of magnets 40. One of the plurality of magnets 40 is disposed within each of the plurality of pole cavities 38. The magnets 40 may include any type of magnetic material suitable for use in the IPM machine 20. For example, each of the magnets 40 may be manufactured from and include a ferrite magnetic material, an Alnico magnetic material, or alternatively from a rare earth magnetic material, such as but not limited to Neodymium iron boron (NdFeB). Preferably, the magnets 40 are rare earth magnets 40 that do not include any heavy rare earth elements. Heavy rare earth elements are described herein as including the following elements: Yttrium (Y), Terbium (Tb), Dysprosium (Dy), Holmium (Ho), Erbium (Er), Thulium™, Ytterbium (Yb), and Lutetium L(u). More specifically, the rare earth magnets 40 preferably do not include either terbium or dysprosium.

The wound stator 22 includes a plurality of windings 42 that magnetically interact with the magnets 40 disposed within the pole cavities 38 of the rotor core 36, to generate torque, and cause rotation of the rotor core 36 about the central axis of rotation 26 relative to the wound stator 22, as is known in the art.

Each pole 28, 32 includes at least one row, and may include a plurality of rows, radially spaced from each other relative to the central axis of rotation 26, with each row having two pole cavities 38 symmetrically disposed on opposing sides of its respective pole axis. Referring to FIG. 1, an exemplary embodiment of the configuration of the pole cavities 38 of the poles of the rotor assembly 24 is generally shown, and described herein with reference to the first pole 28. As shown, the first pole 28 includes a first row 44, a second row 46, a third row 48, and a fourth row 50 radially spaced from each other relative to the central axis of rotation 26. The first row 44 is spaced radially farther from the central axis of rotation 26 than the second row 46, the second row 46 is spaced radially farther from the central axis of rotation 26 than the third row 48, and the third row 48 is spaced radially farther from the central axis of rotation 26 than the fourth row 50. Accordingly, the fourth row 50 is the row that is radially nearest to the central axis of rotation 26, whereas the first row 44 is the row that is radially farthest from the central axis of rotation 26. Each of the first row 44, the second row 46, the third row 48, and the fourth row 50 includes two pole cavities 38, each containing one of the magnets 40 disposed on opposing sides of the first pole axis 30. While the exemplary embodiment of the configuration of the first pole 28 is shown having four rows, with two cavities in each row, it should be appreciated that the configuration may vary from the exemplary embodiment shown and described herein.

Referring to FIGS. 1 and 2, each of the pole cavities 38 includes or defines a cross section, perpendicular to the central axis of rotation 26, that defines a cross sectional shape. As best shown in FIG. 2, the cross sectional shape of each of the pole cavities 38 includes a centerline 52, a first end surface 54, a second end surface 56, an inner edge surface 58, and an outer edge surface 60. The inner edge surface 58 and the outer edge surface 60 of each respective pole cavity are substantially parallel with the centerline 52 of their respective pole cavity. The first end surface 54 of each of the pole cavities 38 is disposed nearer the central axis of rotation 26 than the second end surface 56 of their respective pole cavity. The inner edge surface 58 of each of the pole cavities 38 is generally disposed nearer the central axis of rotation 26 and/or farther from the pole axis than is the outer edge surface 60 of their respective pole cavity.

The cross sectional shape of each of the plurality of pole cavities 38 includes a radially inner barrier portion 62, a radially outer barrier portion 64, and a central portion 66. The central portion 66 of each pole cavity is disposed between the radially inner barrier portion 62 and the radially outer barrier portion 64 of their respective pole cavity. The centerline 52 segment of the radially inner barrier portion 62 is identified by reference numeral 68, the centerline 52 segment of the radially outer barrier portion 64 is identified by reference numeral 70, and the centerline 52 segment of the central portion 66 is identified by the reference numeral 72.

The centerline 52 of the cross sectional shape of each of the radially outer barrier portion 64 and the radially inner barrier portion 62 of each pole cavity is defined by a generally conic or arcuate segment. The centerline 52 of the cross sectional shape of the central portion 66 of each pole cavity is defined by a linear segment.

The generally arcuate segment of the centerline 52 of each of the radially outer barrier portion 64 and the radially inner barrier portion 62 of each pole cavity is defined by the general conic or arcuate Equation 1:

$$Ax^2+Bxy+Cy^2+Dx+Ey+F=0 \qquad 1)$$

wherein A, B, C, D, E, and F are constants, x is a value along an x-axis of a Cartesian coordinate system, and y is a value along a y-axis of a Cartesian coordinate system. Accordingly, the generally arcuate segment of the centerline 52 of each of the radially outer barrier portion 64 and the radially inner barrier portion 62 of each pole cavity may define one of a partial circular segment, a partial elliptical segment, a partial parabolic segment, or a partial hyperbolic segment.

The linear segment of the centerline 52 of the central portion 66 of each pole cavity is defined by the general linear Equation 2:

$$y=mx+b \qquad 2)$$

wherein x is a value along an x-axis of a Cartesian coordinate system, and y is a value along a y-axis of a Cartesian coordinate system, b is the y intercept of the y-axis, and m is the slope of the line segment.

As noted above, one of the magnets 40 is disposed within each of the pole cavities 38. Specifically, each magnet 40 is disposed within the central portion 66 of one of the plurality of pole cavities 38. Each of the plurality of magnets 40 includes a cross section, perpendicular to the central axis of rotation 26, which defines a rectangular cross sectional shape. The magnets 40 are pre-formed and inserted and/or positioned within the pole cavities 38. As such, the magnets 40 are not injection molded in place. The central portion 66 of each of the pole cavities 38 includes a cross section, perpendicular to the central axis of rotation 26, which defines a rectangular cross sectional shape, which is sized to receive one of the magnets 40 therein.

Because the centerline 52 of the central portion 66 of each pole cavity is a linear segment, and because the outer edge surface 60 and the inner edge surface 58 of the respective pole cavity are substantially parallel with the centerline 52, the cross sectional shape of the central portion 66 is substantially rectangular. Because the centerline 52 of the radially inner barrier portion 62 and the radially outer barrier portion 64 of each pole cavity include a conic or arcuate segment, and because the inner edge surface 58 and the outer edge surface 60 of the respective pole cavity are substantially parallel with the centerline 52, the inner edge surface 58 and the outer edge surface 60 of each of the radially inner barrier portion 62 and the radially outer barrier portion 64 also include a general conic or arcuate shape, i.e., curved. Because the inner edge surface 58 and the outer edge surface 60 of the radially inner barrier portion 62 are curved to define the general arcuate section, the rectangular shaped magnet 40 disposed within the central portion 66 is not free to move radially inward toward the central axis of rotation 26. In other words, the curved arcuate section of the radially inner barrier portion 62 prevents the rectangular shaped magnet 40 from moving radially inward. Similarly, the inner edge surface 58 and the outer edge surface 60 of the radially outer barrier portion 64 are curved to define the general arcuate section, the rectangular shaped magnet 40 disposed within the central portion 66 is not free to move radially outward away from the central axis of rotation 26. In other words, the curved arcuate section of the radially outer barrier portion 64 prevents the rectangular shaped magnet 40 from moving radially outward.

The centerline 52 of each pole cavity includes an inner length 74, and outer length 76, and a central length 78. The inner length 74 is defined by the radially inner barrier portion 62 of its respective pole cavity. The outer length 76 is defined by the radially outer barrier portion 64 of its respective pole cavity. The central length 78 is defined by the central portion 66 of its respective pole cavity.

Preferably, and as shown in the exemplary configuration of the pole cavities 38 in FIG. 1, the central length 78 of each pole cavity is greater than the inner length 74 of its respective pole cavity, and the outer length 76 of its respective pole cavity. The outer length 76 of each pole cavity may be between 10% and 60% of the central length 78 of its respective pole cavity. The inner length 74 of each pole cavity may be between 10% and 50% of the central length 78 of its respective pole cavity. The inner length 74 of each pole cavity may be greater than the outer length 76 of its respective pole cavity, such as is shown in the exemplary configuration of the pole cavities 38 in FIG. 1. However, as shown in the exemplary embodiment of FIG. 3, the inner length 74 of each pole cavity is less than the outer length 76 of its respective pole cavity. As shown in the exemplary configuration of the pole cavities 38 in FIG. 1, the length of the centerline 52 of the outer barrier portion of each pole cavity of each row increases with an increase in distance from its respective pole axis.

Referring to FIG. 3, an alternative configuration of the rotor core 36 and the pole cavities 38 is shown. The embodiment of the rotor assembly 24 shown in FIG. 3 differs from the embodiment of the rotor assembly 24 shown in FIG. 1 in the number of rows of pole cavities 38 in each pole, and in the shape and size of the radially inner barrier portion 62 of each pole cavity 38. With the embodiment shown in FIG. 3, the radially outer barrier portion 64 and the central portion 66 remain as described with reference to FIG. 2. As such, the radially outer barrier portion 64 and the central portion 66 are not described in detail with reference to FIG. 3. While the embodiment of the rotor assembly 24 shown in FIG. 3 includes three rows of pole cavities 38, it should be appreciated that the number of rows may vary, and may include the four rows of pole cavities 38 shown in the embodiment of the rotor assembly 24 shown in FIG. 1, or some other number of rows not specifically shown in the exemplary embodiments. Additionally, and as shown in FIG. 3, each of the pole cavities 38 of the rotor core 36 may be formed to include a magnet stop that engages the magnet 40 disposed within their respective pole cavity 38, preventing it from moving radially within the pole cavity relative to the central axis of rotation 26. It should be appreciated that the magnet stops shown in the embodiment of FIG. 3 may be incorporated into the embodiment shown in FIGS. 1 and 2.

As shown in FIG. 3, the radially inner barrier portion 62 does not include the conic or arcuate section that is shown and described in FIG. 1. Rather, the embodiment of the rotor assembly 24 shown in FIG. 3 includes a radially inner barrier portion 62 having more triangularly shaped cross section perpendicular to the central axis of rotation 26, and is much smaller in size and/or volume than the embodiment of the radially inner barrier portion 62 shown in FIG. 1. It should also be appreciated that the rotor assembly 24 may be configured to not include the radially inner barrier portion 62 at all.

Referring to FIG. 3, the rotor core 36 may be configured to include a bridge 90. As shown in FIG. 3, the bridge 90 extends between the inner edge surface and the outer edge surface of each pole cavity, and is disposed between the radially outer barrier portion and the central portion. Furthermore, the bridge 90, may also be added to the exemplary embodiment shown in FIGS. 1 and 2, between the radially inner barrier portion 62 and the central portion 66, and/or between the central barrier portion 66 and the radially outer barrier portion 64. As such, the bridge operates to separate the radially outer barrier portion from the central portion. The bridge 90 adds protection for demagnetization by providing a path for flux leakage.

The shape and size of the radially inner barrier portion 62 and the radially outer barrier portion 64 of each pole cavity, in combination with the configuration of the pole cavities 38 in each pole, shown in both FIGS. 1 and 3, provide excellent protection against demagnetization of the magnets 40 within each of the pole cavities 38. This protection against demagnetization allows for the use of rare earth magnets 40 having no heavy metal elements.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An interior permanent magnet machine comprising:
  a wound stator;
  a rotor core including a plurality of poles, with each pole defining a plurality of pole cavities;
  wherein each of the plurality of pole cavities includes a cross section, perpendicular to a central axis of rotation, defining a cross sectional shape having a centerline;
  wherein the cross sectional shape of each of the plurality of pole cavities includes a radially outer barrier portion and a central portion;
  wherein the centerline of the cross sectional shape of the radially outer barrier portion of each pole cavity is defined by a generally arcuate segment;
  wherein the generally arcuate segment of the centerline of the radially outer barrier portion of each pole cavity is defined by the equation:

$Ax^2 + Bxy + Cy^2 + Dx + Ey + F = 0$ wherein A, B, C, D, E, and F are constants, x is a value along an x-axis of a Cartesian coordinate system, and y is a value along a y-axis of a Cartesian coordinate system;

wherein the centerline of the cross sectional shape of the central portion of each pole cavity is defined by a linear segment; and a plurality of magnets, with one of the plurality of magnets disposed within the central portion of one of the plurality of pole cavities.

2. The interior permanent magnet machine set forth in claim 1 wherein each of the plurality of magnets is a rare earth magnet having no dysprosium or terbium.

3. The interior permanent magnet machine set forth in claim 2 wherein each of the plurality of magnets is a rare earth magnet having no heavy rare earth elements.

4. The interior permanent magnet machine set forth in claim 1 wherein the linear segment of the centerline of the central portion of each pole cavity is defined by the equation:

$$y=mx+b$$

wherein x is a value along an x-axis of a Cartesian coordinate system, and y is a value along a y-axis of a Cartesian coordinate system, b is they intercept of the y-axis, and m is the slope of the line segment.

5. The interior permanent magnet machine set forth in claim 4 wherein the cross sectional shape of each of the plurality of pole cavities includes a radially inner barrier portion, with the central portion disposed between the radially inner barrier portion and the radially outer barrier portion.

6. The interior permanent magnet machine set forth in claim 5 wherein the centerline of the cross sectional shape of the radially inner barrier portion of each pole cavity is defined by a generally arcuate segment defined by the equation:

$$Ax^2+Bxy+Cy^2+Dx+Ey+F=0$$

wherein A, B, C, D, E, and F are constants, x is a value along an x-axis of a Cartesian coordinate system, and y is a value along a y-axis of a Cartesian coordinate system.

7. The interior permanent magnet machine set forth in claim 6 wherein the generally arcuate segment of the centerline of each of the radially outer barrier portion and the radially inner barrier portion of each pole cavity defines one of a partial circular segment, a partial elliptical segment, a partial parabolic segment, or a partial hyperbolic segment.

8. The interior permanent magnet machine set forth in claim 1 wherein each of the plurality of magnets includes a cross section, perpendicular to the central axis of rotation, defining a rectangular cross sectional shape.

9. The interior permanent magnet machine set forth in claim 8 wherein the central portion of each of the pole cavities includes a cross section, perpendicular to the central axis of rotation, defining a rectangular cross sectional shape sized to receive one of the plurality of magnets therein.

10. The interior permanent magnet machine set forth in claim 5 wherein each pole includes a plurality of rows radially spaced from each other relative to the central axis of rotation, with each row having two pole cavities symmetrically disposed on opposing sides of a pole axis.

11. The interior permanent magnet machine set forth in claim 10 wherein each pole includes a first row of pole cavities, a second row of pole cavities, a third row of pole cavities, and a fourth row of pole cavities.

12. The interior permanent magnet machine set forth in claim 10 wherein the centerline of each pole cavity includes an inner length defined by the radially inner barrier portion of its respective pole cavity, an outer length defined by the radially outer barrier portion of its respective pole cavity, and a central length defined by the central portion of its respective pole cavity.

13. The interior permanent magnet machine set forth in claim 12 wherein the central length of each pole cavity is greater than the inner length of the respective pole cavity and the outer length of the respective pole cavity.

14. The interior permanent magnet machine set forth in claim 13 wherein the inner length of each pole cavity is greater than the outer length of the respective pole cavity.

15. The interior permanent magnet machine set forth in claim 13 wherein the outer length of each pole cavity is between 10% and 60% of the central length of the respective pole cavity.

16. The interior permanent magnet machine set forth in claim 13 wherein the inner length of each pole cavity is between 10% and 50% of the central length of the respective pole cavity.

17. The interior permanent magnet machine set forth in claim 12 wherein the length of centerline of the outer barrier portion of each pole cavity of each row increases with an increase in distance from the pole axis.

18. The interior permanent magnet machine set forth in claim 1 wherein the cross sectional shape of each of the plurality of pole cavities includes a first end surface, a second end surface, an inner edge surface, and an outer edge surface, and wherein the inner edge surface and the outer edge surface of each respective pole cavity is parallel with the centerline of their respective pole cavity.

19. The interior permanent magnet machine set forth in claim 18 wherein the rotor core includes a bridge extending between the inner edge surface and the outer edge surface of each pole cavity, between the radially outer barrier portion and the central portion.

* * * * *

UNITED STATES PATENT AND TRADEMARK OFFICE
CERTIFICATE OF CORRECTION

PATENT NO. : 9,755,462 B2
APPLICATION NO. : 14/630023
DATED : September 5, 2017
INVENTOR(S) : Sinisa Jurkovic and Khwaja M. Rahman Page 1 of 1

It is certified that error appears in the above-identified patent and that said Letters Patent is hereby corrected as shown below:

In the Claims

The Equation of Claim 1 in Column 6, Line 67 should read:
$Ax^2+Bxy+Cy^2+Dx+Ey+F=0$ Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*